United States Patent [19]
Robertson, IV

[11] Patent Number: 5,820,893
[45] Date of Patent: Oct. 13, 1998

[54] BREAKAWAY SCRAPER BLADE ASSEMBLY FOR A PELLETIZER

[75] Inventor: Harry Wilson Robertson, IV, Covington, Va.

[73] Assignee: Westvaco Corporation, New York, N.Y.

[21] Appl. No.: 792,849

[22] Filed: Jan. 23, 1997

[51] Int. Cl.$^6$ ...................................................... B29B 9/06
[52] U.S. Cl. ........................ 425/310; 264/143; 425/314; 425/331; 425/363; 425/DIG. 230
[58] Field of Search .................. 425/310, 311, 425/313, 314, 331, 363, DIG. 230; 264/141, 142, 143

[56] References Cited

U.S. PATENT DOCUMENTS

| | | |
|---|---|---|
| 1,567,408 | 12/1925 | Axelsen . |
| 2,311,154 | 2/1943 | Carney . |
| 2,327,016 | 8/1943 | Carney . |
| 2,503,361 | 4/1950 | Studebaker . |
| 2,514,616 | 7/1950 | Adams . |
| 2,638,628 | 5/1953 | Stott et al. . |
| 2,642,343 | 6/1953 | Studebaker . |
| 2,656,257 | 10/1953 | Hohnadel . |
| 2,675,768 | 4/1954 | Helm ........................................ 425/331 |
| 2,806,771 | 9/1957 | Cuthbertson et al. . |
| 3,101,510 | 8/1963 | Packham .................................. 425/331 |
| 3,114,930 | 12/1963 | Oldham et al. . |
| 3,326,642 | 6/1967 | Ruble . |
| 3,781,151 | 12/1973 | Harris . |
| 3,840,345 | 10/1974 | André et al. . |
| 3,904,727 | 9/1975 | Dollinger . |
| 4,038,010 | 7/1977 | Bremer ..................................... 425/331 |
| 4,113,413 | 9/1978 | Pietrusza et al. . |
| 4,166,722 | 9/1979 | Geissler et al. . |
| 4,413,970 | 11/1983 | Seng . |

FOREIGN PATENT DOCUMENTS

| | | | |
|---|---|---|---|
| 3126550 | 7/1982 | Germany ................................. 425/313 |
| 391935 | 3/1974 | U.S.S.R. .......................... 425/DIG. 230 |
| WO 93/22132 | 11/1992 | WIPO ............................ 425/DIG. 230 |

*Primary Examiner*—Patrick Ryan
*Assistant Examiner*—Joseph Leyson
*Attorney, Agent, or Firm*—J. R. McDaniel; R. L. Schmalz

[57] ABSTRACT

This pelletizer relates to pelletizer systems of the type that include a scraper blade. Such structures of this type, generally, employ a removable, replaceable, breakaway scraper blade that can be changed out easily and quickly without damaging the remainder of the blade assembly.

8 Claims, 4 Drawing Sheets

BREAKAWAY SCRAPER BLADE ASSEMBLY FOR A PELLETIZER

BACKGROUND OF THE INVENTION

1. Field of the Invention

This invention relates to pelletizer systems of the type that include a scraper blade. Such structures of this type, generally, employ a removal, replaceable, breakaway scraper blade that can be changed out easily and quickly without damaging the remainder of the blade assembly.

2. Description of the Related Art

It is known, in carbon pellet manufacturing systems, to mix ground acid char with water. This mixture is then combined in a conventional pin mixer. Exemplary of such prior art pin mixers are U.S. Pat. No. 3,326,642 ('642) to T. A. Ruble, entitled "Plastic Lined Carbon Black Agglomerator", U.S. Pat. No. 4,166,722 ('722) to Geissler et al., entitled "Pinned Shaft and Carbon Black Pelleter", and U.S. Pat. No. 3,904,727 ('727) to R. E. Dollinger, entitled "Method of Pelleting Carbon Black".

After the mixture is combined in the pin mixer, this mixture is fed to a conventional granulating machine. Exemplary of such prior art granulating machines are U.S. Pat. No. 2,311,154 ('154) to S. C. Carney, entitled "Process for Agglomerating Commercial Carbon Black", U.S. Pat. No. 2,503,361 ('361) to M. L. Studebaker, entitled "Carbon Black Pelleting", U.S. Pat. No. 4,113,413 ('413) to Pietrusza et al., entitled "Rotary Scraper in a Rotary Drum Assembly", and U.S. Pat. No. 4,413,970 ('970) to S. Seng, entitled "Rotary Scrapers".

While the scrapers employed in the prior art granulating machines are used to remove buildup within the working cylinder, these scrapers are not used to create the pelletized product. This is because in order to properly form pellets the mixture of solids (acid char) and water must be able to properly mixed with a gas within the working cylinder in order to properly form pellets. The buildup of the solid mixture along the inside of the working cylinder does not allow for proper mixture of the solids and water with the gas and, thus, the solids attach to the inside of working cylinder and create the buildup. Consequently, the scraper is needed to remove the buildup from the inside of the working cylinder. Therefore, a more advantageous pellet forming system is needed which would allow the mixture of the ground acid char and water to properly interact with the gas in order to form the pellets.

It is also noted that the granulating machines of the prior art, particularly those of the '154, '361, '413, and '970 patents employ rigid scraper blades. While these scraper blades are able to remove buildup within the working cylinder, if the buildup becomes too solidified, the buildup may adversely effect the scraper blade assembly by bending or breaking the scraper blade assembly.

If the scraper blade is bent or broken and cannot properly remove the buildup, then the scraper blade must be replaced. Consequently, if the scraper blade has to be replaced, this results in costly downtime and lost production for the pellet forming manufacturer. Consequently, a further advantageous pellet forming system will be one which allows for the scraper blade to be more easily replaced.

It is apparent from the above that there exists a need in the art for a pellet forming system which is capable of forming pellets while adequately mixing the various solid, liquid and gaseous compounds, but which at the same time is able to avoid costly downtime due to scraper blade malfunction and replacement.

It is the purpose of this invention to fulfill these and other needs in the art in a manner more apparent to the skilled artisan once given the following disclosure.

SUMMARY OF THE INVENTION

Generally speaking, this invention fulfills these needs by providing a breakaway scraper blade assembly for a pelletizer comprising a working cylinder having an inner and an outer peripheral surface, a thrust cylinder which contacts the outer peripheral surface of the working cylinder to create a nip, a plurality of holes located between the inner and outer peripheral surfaces of the working cylinder such that as a granulated solid is placed into the nip, the thrust cylinder forces the granulated solid substantially through the holes in the working cylinder, and an improved scraper assembly located adjacent to the inner peripheral surface of the working cylinder such that the scraper blade contacts the inner peripheral surface of the working cylinder to scrape substantially any granulated solid that was forced through and which extends beyond the plurality of holes, wherein the improvement includes a blade means that is capable of breaking away from the assembly.

In certain preferred embodiments, the breakaway scraper blade assembly includes a connecting rod, a connecting arm, and a breakaway blade. Also, the breakaway blade may be constructed of polytetrafluoroethylene, ceramic, metallic or other such suitable, durable material.

In another further preferred embodiment, the breakaway scraper blade assembly allows for the scraper blade to breakaway without adversely effecting the other components of the assembly. In this manner, the assembly can be easily and quickly replaced, thereby, avoiding a large amount of downtime and lost production.

The preferred breakaway scraper blade assembly, according to this invention, offers the following advantages: ease of assembly and replacement; excellent scraping characteristics; good stability; excellent durability; good economy; and high strength for safety. In fact, in many of the preferred embodiments, these factors of ease of assembly and replacement and durability, are optimized to an extent that is considerably higher than heretofore achieved in prior, known scraper blade assemblies.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
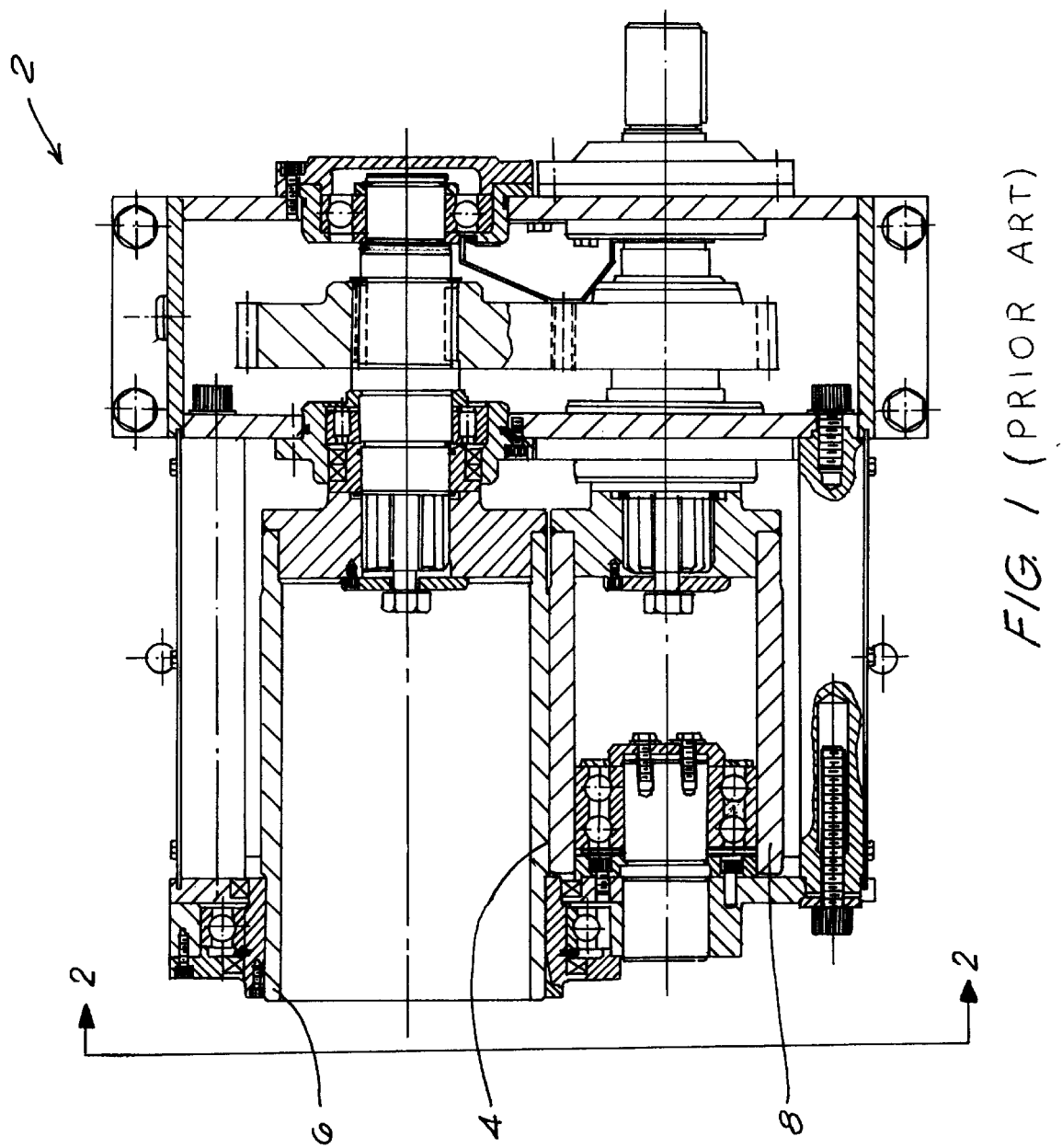
FIG. 1 is a top plan view (partially in cross section)of an Alexanderwerk pelletizer, according to the prior art.

As discussed earlier with respect to prior art, ground acid char (not shown) is mixed with water (not shown) and conventionally pin mixed. As shown in FIG. 1, this mixture is then fed to a conventional granulating machine 2, manufactured by Alexanderwerk of Remscheid, Germany. The material is processed through a nip area 4 between working cylinder 6 and thrust cylinder 8. Working cylinder 6 is conventionally perforated (perforations 12 in FIG. 2). As the ground acid char/water mixture is compressed in nip area 4, the mixture is forced through working cylinder 6 (extruded pellets 14 in FIG. 2).

The nip gap or distance between working cylinder 6 and thrust cylinder 8 is, typically, 0.030 inches or less. It is common for foreign matter to infiltrate the process and be forced through nip 4. Since the wall thickness of the perforated working cylinder 6 is relatively thin, the presence of such foreign matter may cause the wall of working cylinder 6 to bow inwardly causing a convex occlusion within working cylinder 6.

Figure 2:
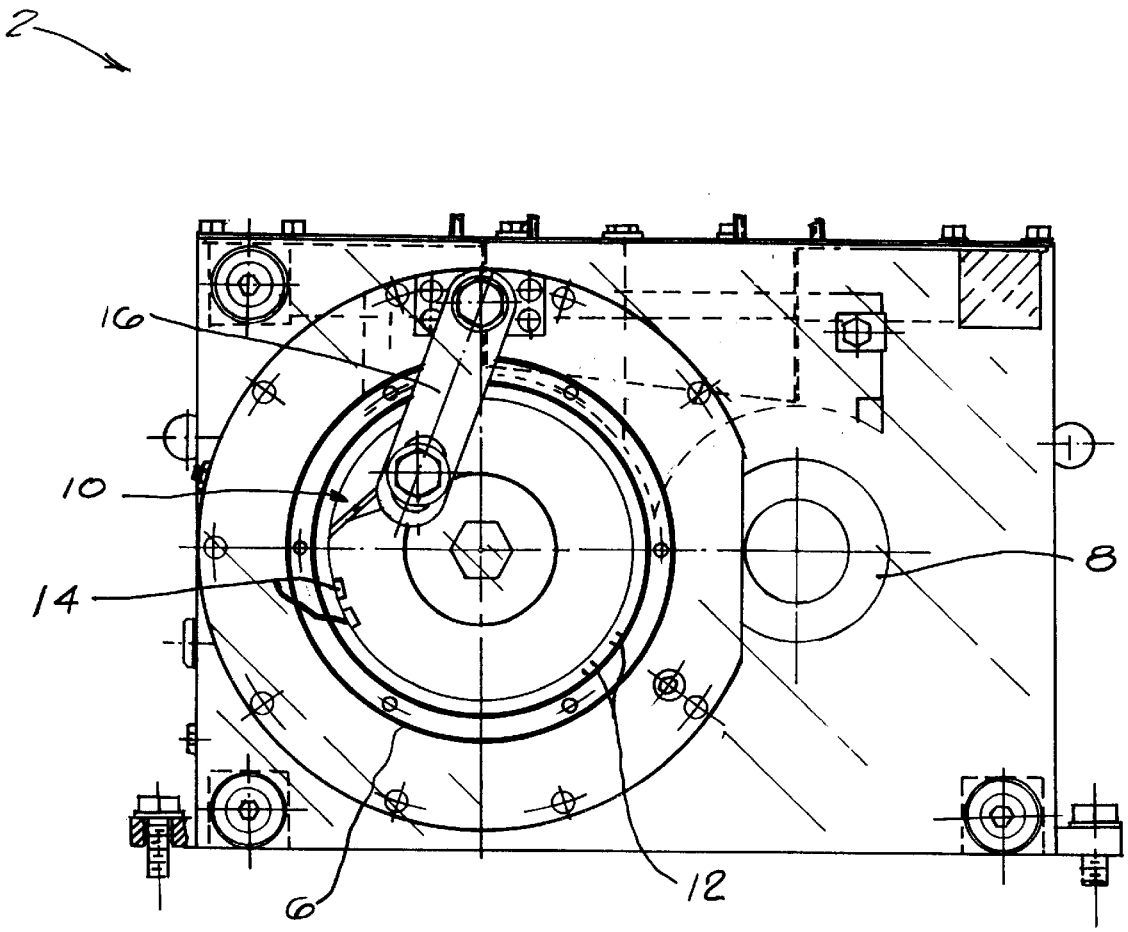
FIG. 2 is an end view of the Alexanderwerk pelletizer, in the direction of lines 2—2 of FIG. 1, according to the prior art.

As shown in prior art FIG. 2, a conventional scraper assembly 10 is used within working cylinder 6 to break off extruded pellets 14 that have been pushed through perforations 12. Typically, scraper assembly 10 is set at approximately 1 mm from the inside wall of working cylinder 6. Any inward protrusions within working cylinder 6 will damage or destroy the scraper blade of scraper assembly 10. This is because the scraper blade of scraper assembly 10 is, typically, constructed of a single piece of stainless steel.

Figure 3:
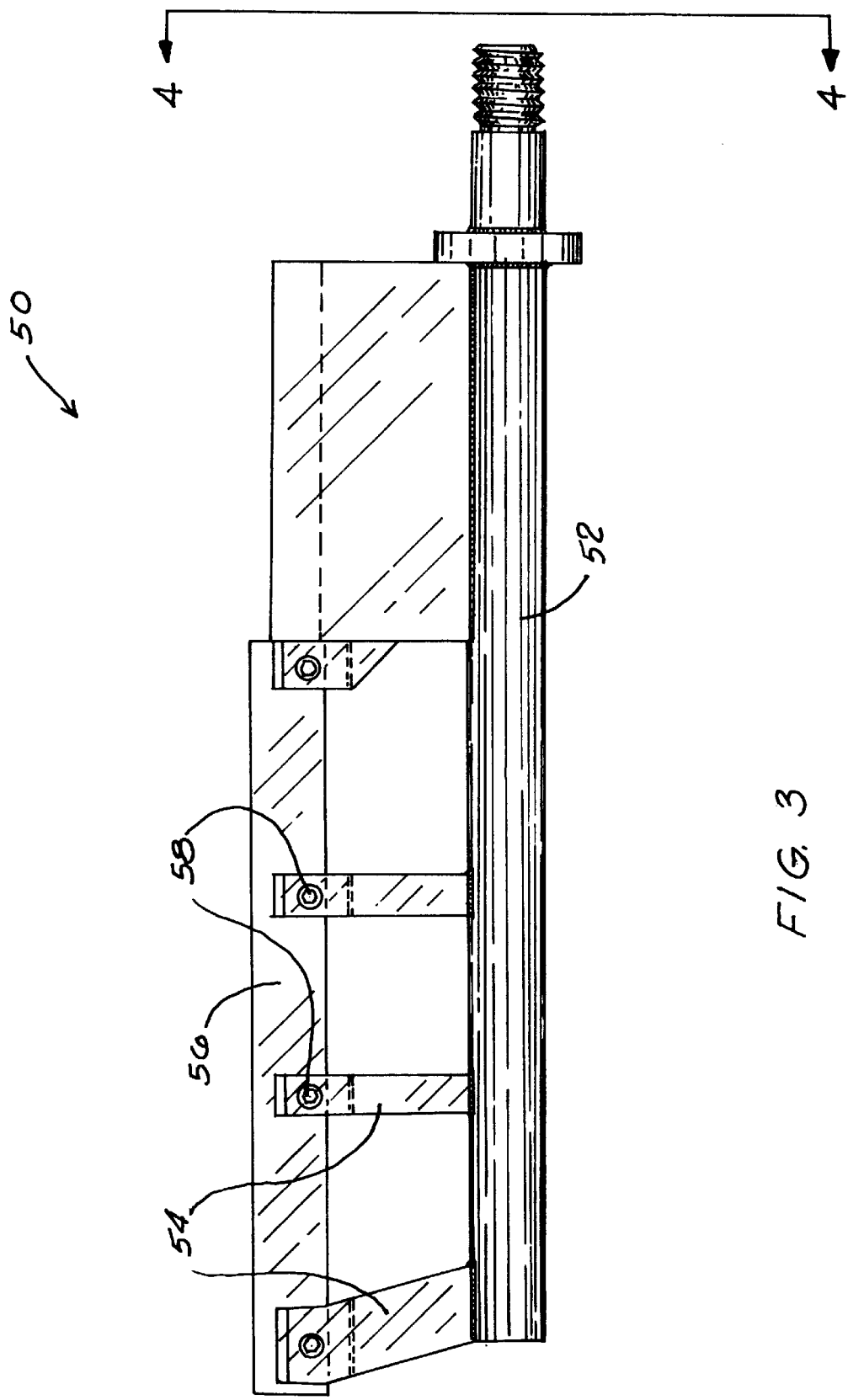
FIG. 3 is side plan view of a breakaway scraper blade assembly, according to the present invention.
Figure 4:
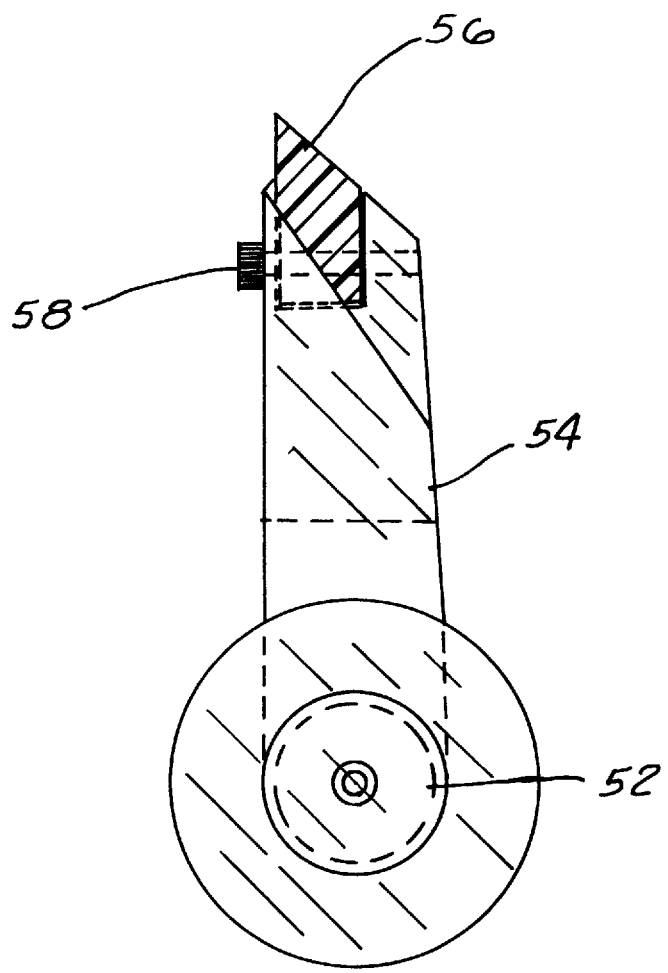
FIG. 4 is a side plan view of the breakaway scraper blade assembly (scraper blade cross-section), taken in the direction of lines 4—4 in FIG. 3, according to the present invention.

An improvement upon the scraper blade assembly 10 of FIG. 2 is the breakaway scraper blade assembly 50, as shown in FIGS. 3 and 4. Assembly 50 includes, in part, conventional arm 52, blade supports 54, breakaway blade 56, and fasteners 58. Preferably, arm 52 and supports 54 are constructed of any suitable metallical material, such as, stainless steel. Also, blade 56, preferably, is constructed of any suitable, durable material, such as polytetrafluoroethylene, various polymeric materials, various metallic materials, and various ceramic materials.

During the construction of assembly 50, supports 54 are rigidly attached to arm 52 by any suitable technique. Also, blade 56 is attached to supports 54 by conventional fasteners 58. Finally, arm 52 is attached to conventional pivoting arm 16 (FIG. 2) in working cylinder 6 by conventional techniques.

During the operation of blade assembly 50, the new design of scraper blade 56 allows blade 56 to breakaway if the wall of working cylinder 6 (FIG. 2) collapses to the inside. Contrary to what was happening in the prior art, scraper blade assembly 50 allows the scraper blade 56 to breakaway without adversely effecting the entire scraper assembly 50 or supports arm 54. Also, assembly 50 allows for scraper blade 56 to be easily removed/replaced without seriously affecting the downtime and/or production.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A breakaway scraper blade assembly for a pelletizer, wherein said assembly is comprised of:

a working cylinder having an inner and an outer peripheral surface;

a thrust cylinder which contacts said outer peripheral surface of said working cylinder to create a nip;

a plurality of holes located between said inner and outer peripheral surfaces of said working cylinder such that as a granulated solid is placed into said nip said thrust cylinder forces said granulated solid substantially through said holes in said working cylinder; and said scraper assembly including a scraper blade located adjacent to said inner peripheral surface of said working cylinder such that said scraper blade contacts said inner peripheral surface of said working cylinder to scrape away substantially any granulated solid that was forced through and which extends beyond said plurality of holes, wherein said scraper blade assembly includes a blade means defined by said scraper blade that is capable of breaking away from said scraper assembly.

2. The scraper blade assembly, as in claim 1, wherein said scraper assembly is further comprised of:

an arm means operatively connected to said assembly; and a blade support means rigidly attached to said arm means and said blade means.

3. The scraper blade assembly, as in claim 2, wherein said arm means is constructed of:

stainless steel.

4. The scraper blade assembly, as in claim 2, wherein said blade support means is constructed of:

stainless steel.

5. The scraper blade assembly, as in claim 1, wherein said scraper blade is constructed of:

a rigid durable material.

6. The scraper blade assembly, as in claim 5, wherein said scraper blade is constructed of:

polytetrafluoroethylene.

7. The scraper blade assembly, as in claim 5, wherein said scraper blade is constructed of:

a polymeric material.

8. The scraper blade assembly, as in claim 5, wherein said scraper blade is constructed of:

a ceramic material.

* * * * *